United States Patent
Tamura

(10) Patent No.: US 7,664,016 B2
(45) Date of Patent: Feb. 16, 2010

(54) DATA TRANSFER DEVICE

(75) Inventor: Toshiya Tamura, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 437 days.

(21) Appl. No.: 11/496,818

(22) Filed: Aug. 1, 2006

(65) Prior Publication Data

US 2007/0183325 A1 Aug. 9, 2007

(30) Foreign Application Priority Data

Feb. 8, 2006 (JP) .............................. 2006-031504

(51) Int. Cl.
*G01R 31/08* (2006.01)
*G06F 11/00* (2006.01)
*G08C 15/00* (2006.01)
*H04J 3/16* (2006.01)
*H04J 3/22* (2006.01)

(52) U.S. Cl. ..................... 370/229; 370/216; 370/465

(58) Field of Classification Search ................ 370/235, 370/236, 242, 248, 310, 311, 312, 395.2, 370/400, 401, 406, 410, 449, 450, 493, 496, 370/912, 913, 230, 231, 229, 216, 465; 455/552, 455/553, 41, 569.1, 553.1, 550.1, 554.2, 455/561, 95, 115.1
See application file for complete search history.

(56) References Cited

U.S. PATENT DOCUMENTS 6,249,811 B1 6/2001 Kido
7,233,787 B2 6/2007 Higuchi et al.
7,292,588 B2 * 11/2007 Milley et al. ................ 370/401
7,512,688 B2 3/2009 Ogushi et al.
2003/0125074 A1 * 7/2003 Tanada et al. ............... 455/552
2005/0113149 A1 * 5/2005 Tamura et al. ........... 455/569.1

FOREIGN PATENT DOCUMENTS

| JP | 10-304010 A | 11/1998 |
|---|---|---|
| JP | 2000-286921 A | 10/2000 |
| JP | 2001-320437 A | 11/2001 |
| JP | 2002-368775 A | 12/2002 |
| JP | 2003-524961 A | 8/2003 |
| JP | 2003-258935 A | 9/2003 |
| WO | WO 01/73569 A1 | 10/2001 |

OTHER PUBLICATIONS

Japanese Office Action dated May 26, 2009 (2 pages), and English translation thereof (3 pages), issued in counterpart Japanese Application Serial No. 2006-031504.

* cited by examiner

*Primary Examiner*—Derrick W Ferris
*Assistant Examiner*—Maharishi Khirodhar
(74) *Attorney, Agent, or Firm*—Frishauf, Holtz, Goodman & Chick, P.C.

(57) ABSTRACT

In a cellular telephone, a music data transfer control unit and a remote control unit control a close-range radio communications unit to establish a remote control session and a data transfer session, between the music data transfer control unit, remote control unit and an audio device, and transfer audio data to the audio device. If the data transfer session is not established during predetermined periods (W1+W2) after the establishment of the remote control session, a control unit disconnects the remote control session.

8 Claims, 2 Drawing Sheets

DATA TRANSFER DEVICE

CROSS-REFERENCE TO RELATED APPLICATIONS

This application is based upon and claims the benefit of priority from prior Japanese Patent Application No. 2006-031504, filed Feb. 8, 2006, the entire contents of which are incorporated herein by reference.

BACKGROUND OF THE INVENTION

1. Field of the Invention

This invention relates to a data transfer device capable of transferring data such as audio data downloaded via a mobile communications network to an external device.

2. Description of the Related Art

A cellular telephone comprises a function of storing and playing audio data downloaded via a mobile communications network. The cellular telephone further comprises a close-range radio communications function such as Bluetooth conforming to Advanced Audio/Video Distribution Profile (Bluetooth™ SIG) and a function of transferring downloaded and stored audio data to an external device (hereinafter called a data transfer function).

The cellular telephone comprising the close-range radio communications function conforming to Advanced Audio/Video Distribution Profile (Bluetooth SIG) can serve as a remote controller to control the external device from a distance (hereinafter called a remote control function) or can be controlled by the external device from a distance.

The present inventor has developed a system employing the close-range radio communications function, wherein the external device requests the cellular telephone to designate or transfer the audio data by the remote control function and, in response to this request, the cellular telephone transfers the designated audio data to the external device by the data transfer function.

The present inventor has considered a system of establishing a remote control session between the cellular telephone and the external device to employ the remote control function and then establishing another remote control session therebetween to perform the data transfer function. In this system, for example, if the external device does not have the data transfer function, data is not transfer although the remote control session is established, and the remote control session may be maintained unnecessarily.

According to the prior art, if a packet communications link is established between two devices but no data is transferred via the link, the link is disconnected (refer to, for example, National Publication No. 2003-524961 and Jpn. Pat. Appln. KOKAI Publication No. 2002-368775). However, the technique disclosed in these documents is associated with a single session but is not associated with two sessions.

The conventional data transfer device has a problem that if two sessions are established to transfer the data, one of the sessions may be maintained although the data transfer is not executed.

BRIEF SUMMARY OF THE INVENTION

The present invention has been accomplished to solve the above-described problems. The object of the present invention is to provide a data transfer device capable of disconnecting an unnecessary session in a case where two sessions are established to transfer the data.

To achieve this object, an aspect of the present invention is a data transfer device, comprising first communications means for establishing a first session with an external device to make communications therewith, second communications means for establishing a second session with the external device to make communications therewith; and control means for disconnecting the first session if the second communications means does not establish the second session with the external device during a preset period t1 after the first communications means establishes the first session with the external device.

According to the present invention, an unnecessary session can be disconnected in a case where two sessions are established to transfer the data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained below with reference to the accompanying drawings.

Figure 1:
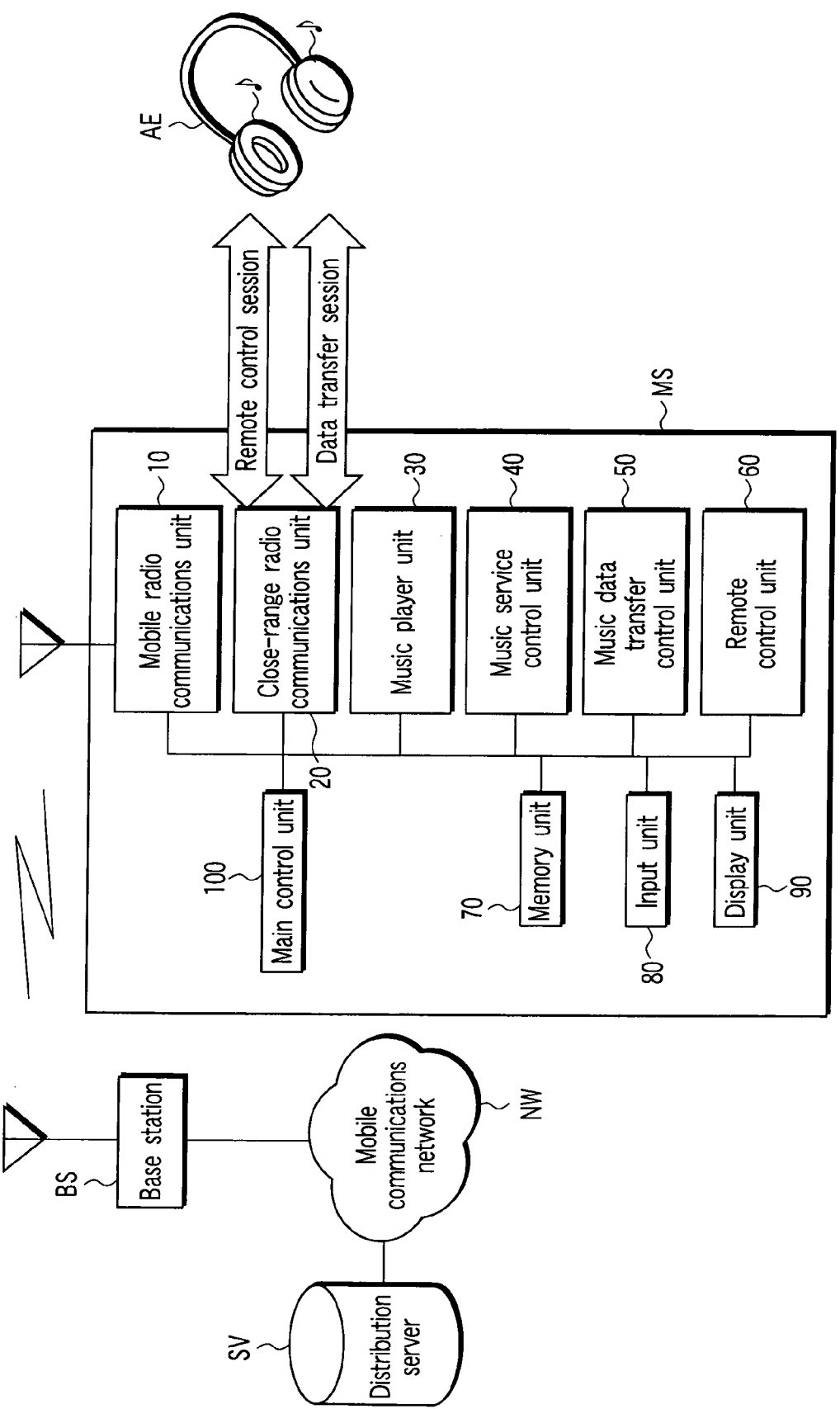
FIG. 1 shows an illustration of a data transfer device according the an embodiment of the present invention and a system to which the data transfer device is applied.

FIG. 1 shows a data transfer device according an embodiment of the present invention. In FIG. 1, a cellular telephone MS serves as the data transfer device and an audio device AE serves as an external device.

The cellular telephone MS is capable of making audio communications through a base station BS and a mobile communications network NW, and downloads audio data from a distribution server through the base station BS and the mobile communications network NW. The cellular telephone MS establishes both a remote control session for conducting the remote control and a data transfer session for transferring data such as the audio data, by the close-range radio communications such as Bluetooth™ between the cellular telephone MS and the audio device AE.

In response to a request from the audio device AE over the remote control session, for example, the cellular telephone MS transfers the audio data to the audio device AE over the data transfer session. The audio device AE receiving the audio data plays music based on the audio data.

The cellular telephone MS comprises a mobile radio communications unit 10, a close-range radio communications unit 20, music player unit 30, a music service control unit 40, a music data transfer control unit 50, a remote control unit 60, a memory unit 70, an input unit 80, a display unit 90 and a control unit 100, as shown in FIG. 1.

The mobile radio communications unit 10 makes radio communications with the base station BS accommodated in the mobile communications network NW, and makes speech communications through the base station BS and the mobile communications network NW. In accordance with an instruction from the music service control unit 40, the mobile radio communications unit 10 makes communications with the distribution server SV and downloads the audio data stored in the distribution server SV through the base station BS and the mobile communications network NW, and stores the audio data in the memory unit 70.

The close-range radio communications unit 20 is a radio communications unit which makes close-range radio communications with the audio device AE over the Bluetooth. In accordance with an instruction from the remote control unit 60 to be described later, for example, the close-range radio communications unit 20 establishes the remote control session conforming to the Audio/Video Distribution Profile (Bluetooth SIG), between the cellular telephone MS and the audio device AE, and sends thereto or receives therefrom the remote control data over the remote control session.

In addition, in accordance with an instruction from the music data transfer control unit 50 to be described later, for example, the close-range radio communications unit 20 establishes the data transfer session conforming to the Audio/Video Distribution Profile (Bluetooth SIG), between the cellular telephone MS and the audio device AE, and sends thereto the audio data over the data transfer session.

The music player unit 30 retrieves the audio data stored in the memory unit 70, in accordance with an instruction from the control unit 100. Then the music player unit 30 decodes the audio data into an analog signal and plays the music on the basis of the analog signal.

The music service control unit 40 controls the mobile radio communications unit 10 to download the audio data when the music service control unit 40 receives an instruction to download the audio data from the control unit 100.

The music data transfer control unit 50 controls the close-range radio communications unit 20 to establish the data transfer session between the cellular telephone MS and the audio device AE when the music data transfer control unit 50 receives an instruction from the control unit 100 or a request for the establishment of the data transfer session from the audio device AE. Then, the music data transfer control unit 50 retrieves the audio data designated by the control unit 100 from the memory unit 70 and controls close-range radio communications unit 20 to send the audio data to the audio device AE over the data transfer session.

The remote control unit 60 controls the close-range radio communications unit 20 to establish the remote control session between the cellular telephone MS and the audio device AE when the remote control unit 60 receives an instruction of sending the remote control data from the control unit 100 or a request for the establishment of the remote control session from the audio device AE. Then, the remote control unit 60 controls the close-range radio communications unit 20 to send command data received from the control unit 100 to the audio device AE over the remote control session or to receive the command data from the audio device AE over the remote control session.

The memory unit 70 stores control programs and control data of the control unit 100, the downloaded audio data, etc. The input unit 80 is a user interface composed of a plurality of key switches, which accepts a request from the user. The display unit 90 is composed of a LCD (Liquid Crystal Display), which displays the characters and images.

The control unit 100 controls all the unit of the cellular telephone MS. For example, the control unit 100 comprises a function of controlling the mobile radio communications unit 10 to execute speech communications and download the audio data via the base station BS and the mobile communications network NW, in accordance with user instructions input via the input unit 80, and a function of controlling the music data transfer control unit 50 and the remote control unit 60 to transfer the audio data to the audio device AE.

Figure 2:
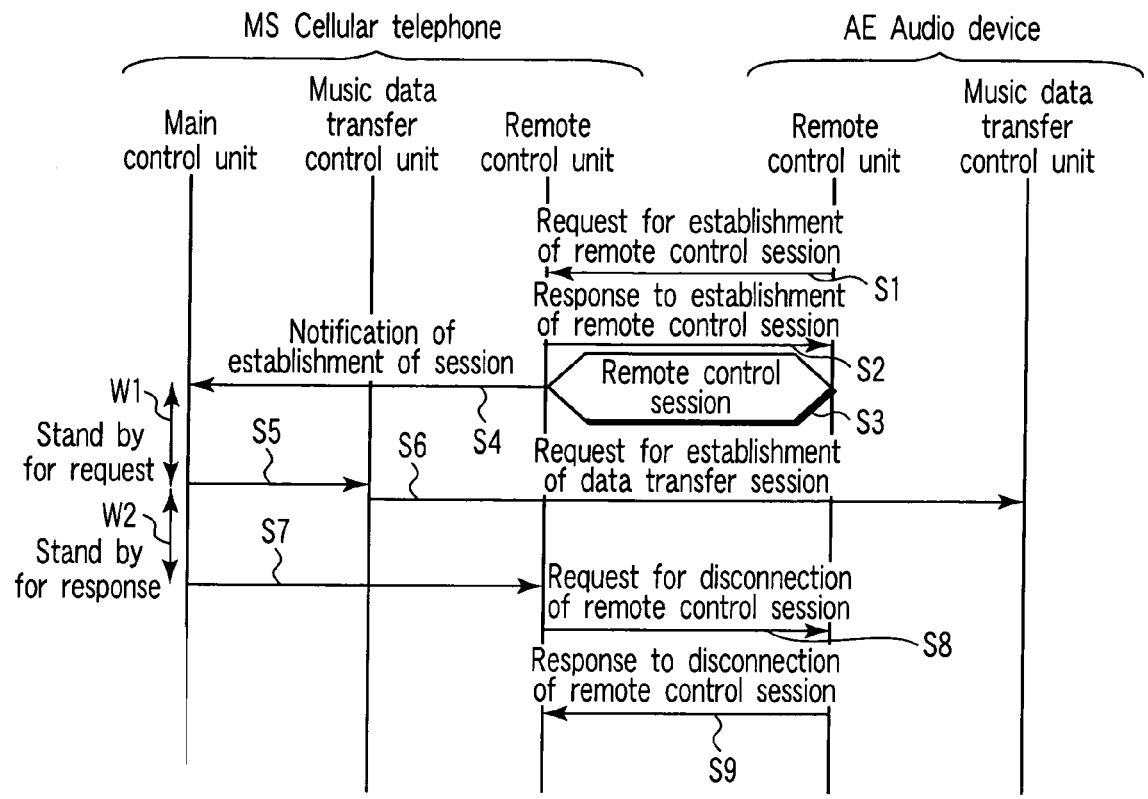
FIG. 2 shows an illustration of sequences of information exchange executed between the data transfer device shown in FIG. 1 and an external device.

Next, operations of the cellular telephone MS having the above-described configuration, particularly, operations of transferring the audio data to the audio device AE are explained. FIG. 2 shows sequences of information exchange executed between the cellular telephone MS and the audio device AE. The audio device AE comprises the same constituent elements as the close-range radio communications unit 20, the music data transfer control unit 50 and the remote control unit 60 provided in the cellular telephone MS.

First, when the audio device AE makes a request for establishment of the remote control session over the close-range radio communications (sequence S1), the request is received by the close-range radio communications unit 20 and the remote control unit 60 is notified of the request. This request includes identification information of identifying the audio device AE.

On the other hand, when the notification of the request for establishment is detected, the remote control unit 60 controls the close-range radio communications unit 20 to send a response to establishment of the remote control session. The close-range radio communications unit 20 thereby sends the response to establishment (sequence S2), and the remote control session is thereby established between the cellular telephone MS and the audio device AE (sequence S3). This response includes identification information of identifying the audio device AE.

When the remote control session is thus established, the remote control unit 60 notifies the control unit 100 of the establishment of the remote control session and the identification information of the audio device AE (sequence S4). When the notification is detected in the control unit 100, the control unit 100 stands by for a request for establishment of the data transfer session to be sent from the audio device AE, during a predetermined period W1. In other words, the music data transfer control unit 50 monitors the information received by the close-range radio communications unit 20, during the predetermined period W1. When the music data transfer control unit 50 detects the request for establishment of the data transfer session, the music data transfer control unit 50 notifies the control unit 100 of the detection.

When the music data transfer control unit 50 detects the request for establishment of the data transfer session, in the information received by the close-range radio communications unit 20, the music data transfer control unit 50 confirms whether or not the identification information included in the request for establishment matches the identification information of the audio device AE.

If the identification information included in the request matches the identification information of the audio device AE, the music data transfer control unit 50 notifies the control unit 100 of the detection of the request for establishment and the identification information and controls the close-range radio communications unit 20 to send a response to the establishment of the data transfer session. The data transfer session is thereby established between the cellular telephone MS and the audio device AE.

If the identification information included in the request does not match the identification information of the audio device AE, the music data transfer control unit 50 continues monitoring the information received by the close-range radio communications unit 20.

In a case where the request for establishment of the data transfer session is not detected during the predetermined period W1, i.e., a case where the music data transfer control unit 50 does not notify the control unit 100 of the identification information of the audio device AE during the predetermined period W1, the control unit 100 instructs the music data transfer control unit 50 to establish the data transfer session with the audio device AE (sequence S5).

In response to this instruction, the music data transfer control unit 50 controls the close-range radio communications unit 20 to send a request for establishment of the data transfer session to the audio device AE. The close-range radio communications unit 20 thereby sends the request for establishment to the audio device AE (sequence S6).

After the request for establishment is thus sent to the audio device AE, the control unit 100 stands by for a response to the establishment of the data transfer session to be sent from the audio device AE, during a predetermined period W2. In other words, the music data transfer control unit 50 monitors the information received by the close-range radio communications unit 20 during the predetermined period W2. When the music data transfer control unit 50 detects the response to the establishment of the data transfer session, the music data transfer control unit 50 notifies the control unit 100 of the detection.

When the music data transfer control unit 50 detects the response to the establishment of the data transfer session, in the information received by the close-range radio communications unit 20, the music data transfer control unit 50 confirms whether or not the identification information included in the request for the establishment matches the identification information of the audio device AE.

If the identification information included in the request matches the identification information of the audio device AE, the music data transfer control unit 50 notifies the control unit 100 of the detection of the response to the establishment and the identification information and controls the close-range radio communications unit 20 to establish the data transfer session. The data transfer session is thereby established between the cellular telephone MS and the audio device AE. If the identification information included in the request does not match the identification information of the audio device AE, the music data transfer control unit 50 continues monitoring the information received by the close-range radio communications unit 20.

In a case where the response to the establishment of the data transfer session is not detected during the predetermined period W2, i.e., a case where the music data transfer control unit 50 does not notify the control unit 100 of the identification information of the audio device AE, the control unit 100 instructs the remote control unit 60 to disconnect the remote control session established in sequence S2 (sequence S7). In response to this instruction, the remote control unit 60 controls the close-range radio communications unit 20 to send a request for disconnection of the remote control session. The close-range radio communications unit 20 thereby sends the request for disconnection to the audio device AE (sequence S8).

When the request for disconnection is detected, the audio device AE sends a response to the disconnection of the remote control session in response to the request (sequence S9). The close-range radio communications unit 20 receiving the response disconnects the remote control session established between the cellular telephone MS and the audio device AE and ends the processing.

In the cellular telephone MS, two sessions are established to execute the data transfer as described above. If the data transfer session is not established during the predetermined periods (W1+W2) after the remote control session has been established between the cellular telephone MS and the audio device AE, the remote control session is disconnected.

The reason why the data transfer session is not established after the establishment of the remote control session may be that the audio device AE cannot accept the establishment of the data transfer session or that the audio device AE does not comprise the function of establishing the data transfer session.

Thus, if the data transfer session cannot be established for this reason in the cellular telephone MS having the above-described configuration, unnecessary remote control session can be disconnected and the power consumption can by thereby saved.

In a case where the data transfer session is not established when the predetermined period (W1) elapses after the remote control session has been established between the cellular telephone MS and the audio device AE, the cellular telephone MS sends to the audio device AE the request for establishment of the data transfer session.

Thus, the request for establishment of the data transfer session is sent to the audio device AE even in a case where the cellular telephone MS is unable to receive the request for establishment of the data transfer session from the audio device AE due to temporary degradation of the radio wave environment or errors in the steps of establishing the data transfer session. Disconnection of the remote control session contrary to the intention of the audio device AE side can be therefore prevented.

The present invention is not limited to the embodiments described above and various modifications can be implemented within the scope of this invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

In the above-described embodiment, the cellular telephone MS establishes the remote control session and the data transfer session between the cellular telephone MS and the audio device AE, on the basis of the identification information of the audio device AE. For example, however, the present invention can also be applied to a case of establishing the remote control session between the cellular telephone MS and a personal computer PC on the basis of identification information of the personal computer PC, and establishing the data transfer session between the cellular telephone MS and the audio device AE on the basis of the identification information of the audio device AE, as shown in FIG. 3.

Figure 3:
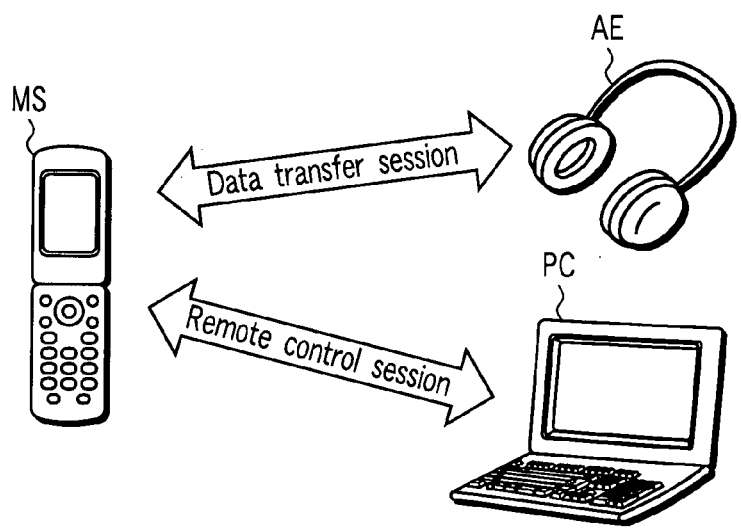
FIG. 3 shows an illustration of a modified example of the system to which the data transfer device of the present invention is applied.

In the configuration shown in FIG. 3, the cellular telephone MS transfers to the audio device AE the audio data over the data transfer session, in response to the request sent from the personal computer PC over the remote control session.

Furthermore, the remote control session is disconnected in a case where the data transfer session is not established after the establishment of the remote control session. However, if the remote control session is not established after the establishment of the data transfer session, the data transfer session may be disconnected.

The present invention can also be various modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data transfer device comprising:
a session establish unit which establishes a first communication session and a second communication session with an external device, wherein the first communication session conveys command data between the data transfer device and the external device, and the second communication session conveys audio data from the data transfer device to the external device;
a session control unit which: controls the session establish unit to establish the first communication session with the external device in response to a request for establishing the first communication session from the external device, waits for a second request for establishing the second communication session from the external device, controls the session establish unit to transmit a third request for establishing the second communication session to the external device if no second request is received from the external device, and controls the session establish unit to disconnect the established first communication session if no second communication session is established with the external device.

2. The data transfer device according to claim 1, wherein the session control unit waits for the second request for a first predetermined time period before transmitting the third request to the external device, and disconnects the first communication session if no response to the third request is received within a second predetermined time period from the external device.

3. The data transfer device according to claim 1, wherein the first and second communication sessions are established separately between the data transfer device and the external device.

4. The data transfer device according to claim 1, wherein the session control unit compares first identical information of the external device, with which the data transfer device establishes the first communication session, and second identification information contained in the second request, and establishes the second communication session with the external device if the second identification information matches the first identification information.

5. A cellular telephone comprising:
a radio communication unit which communicates with a base station of a cellular network;
a download control unit which downloads audio data from a server via the radio communication unit;
a storage unit which stores the downloaded audio data;
a session establish unit which establishes a first communication session and a second communication session with an external device, wherein the first communication session conveys command data between the cellular telephone and the external device, and the second communication session transfers the downloaded audio data in the storage unit to the external device;
a session control unit which: controls the session establish unit to establish the first communication session with the external device in response to a request for establishing the first communication session from the external device, waits for a second request for establishing the second communication session from the external device, controls the session establish unit to transmit a third request for establishing the second communication session to the external device if no second request is received from the external device, and controls the session establish unit to disconnect the established first communication session if no second communication session is established with the external device.

6. The cellular telephone according to claim 5, wherein the session control unit waits for the second request for a first predetermined time period before transmitting the third request to the external device, and disconnects the first communication session if no response to the third request is received within a second predetermined time period from the external device.

7. The cellular telephone according to claim 5, wherein the first and second communication sessions are established separately between the cellular telephone and the external device.

8. The cellular telephone according to claim 5, wherein the session control unit compares first identification information of the external device, with which the data transfer device establishes the first communication session, and second identification information contained in the second request, and establishes the second communication session with the external device if the second identification information matches the first identification.

* * * * *